United States Patent [19]

Christ et al.

[11] Patent Number: 4,521,691
[45] Date of Patent: Jun. 4, 1985

[54] SHIELDING CONTAINER HAVING NEUTRON SHIELDING FOR THE TRANSPORTATION AND/OR STORAGE OF RADIOACTIVE MATERIAL

[75] Inventors: Richard Christ, Bruchköbel; Erhard Müller, Gründau; Hans-Günther Knackstedt, Langenselbold; Reiner Laug, Hanau, all of Fed. Rep. of Germany

[73] Assignee: Transnuklear GmbH, Hanau, Fed. Rep. of Germany

[21] Appl. No.: 422,167

[22] Filed: Sep. 23, 1982

Related U.S. Application Data

[63] Continuation of Ser. No. 206,674, Nov. 13, 1980, abandoned.

[30] Foreign Application Priority Data

Nov. 17, 1979 [DE] Fed. Rep. of Germany ... 7932570[U]

[51] Int. Cl.³ .................................. G21C 19/00
[52] U.S. Cl. .................................. 250/506.1; 376/272
[58] Field of Search .................... 250/506.1, 507.1; 376/272

[56] References Cited

U.S. PATENT DOCUMENTS

| | | | |
|---|---|---|---|
| 3,659,108 | 4/1972 | Quase | 250/519 |
| 3,727,060 | 4/1973 | Blum | 250/506.1 |
| 4,277,688 | 7/1981 | Yamamoto et al. | 250/506.1 |
| 4,388,268 | 6/1983 | Knackstedt et al. | 250/506.1 |

Primary Examiner—Bruce C. Anderson
Attorney, Agent, or Firm—Cushman, Darby & Cushman

[57] ABSTRACT

For the conveying and storage of radioactive materials there are needed containers which shield gamma and neutron-radiation and dissipate the heat of decay whereby there is desired a variable neutron shielding. This is obtained by a neutron shielding between the cooling fins of the container which is fixed on the cooling fins by bosses.

6 Claims, 3 Drawing Figures

SHIELDING CONTAINER HAVING NEUTRON SHIELDING FOR THE TRANSPORTATION AND/OR STORAGE OF RADIOACTIVE MATERIAL

This is a continuation of application Ser. No. 206,674, filed Nov. 13, 1980, now abandoned.

BACKGROUND OF THE INVENTION

The invention is directed to a conveying and/or storage container for radioactive materials which produce $\gamma$ and neutron-radiation emissions and noteworthy residual heat, essentially consisting of a container body having shielding function for $\gamma$-radiation, a neutron shielding and cooling fins whereby the neutron shielding is arranged between the bar shaped fins.

Containers which are employed for conveying and/or storing spent fuel elements must safely confine the radioactivity of the inserted material and demonstrate in strength tests that this is also guaranteed in extreme accident situations. However, simultaneously they must also shield off the gamma and neutron rays which are set free in the radioactive decay reaction and carry off the heat of decay to the outside.

Known shielding containers generally consist of a metallic base container with the required mechanical strength and the required wall thickness for shielding the gamma rays, and are customarily made of steel or a combination of lead and steel and an outer shell of neutron shielding material, generally small polyethylene spheres cast in synthetic resin. Normally there are welded or soldered heat conducting bars or fins penetrating the resin layer to the metallic base body.

It is disadvantageous in these constructions that even slight collisions of the containers, which can occur even in routine operation, can lead to damage of the heat conducting fins and the resin layer and accordingly require an expensive repair of the entire container.

A further disadvantage of this known shielding container is that the thickness of the neutron shielding must be designed for the maximum planned conveyance.

In German OS 2065863 it is proposed to clamp on neutron absorbing molded bodies, which are located between the ribs, by mutually pressing against the base body. This mere force fit and the numerous necessary bolts, however, represents a significantly weak point in the operational safety of the container.

Therefore it was the problem of the present invention to produce a conveying and/or storage container for radioactive materials which emit $\gamma$ and neutron-radiation and mentionable heat of decay consisting essentially of a container body having shielding function for $\gamma$-radiation, a neutron shielding and cooling fins, whereby the neutron shielding is arranged between the bar shaped cooling fins, in which there are made possible a quickly variable fitting of the neutron shielding and guaranteed substantial safety of operation.

SUMMARY OF THE INVENTION

This problem was solved according to the invention by holding the neutron shielding on the cooling fins by bosses.

BRIEF DESCRIPTIONS OF THE DRAWINGS

In the drawings like numerals refer to like parts.

The containers of the invention can comprise, consist essentially of or consist of the stated elements.

DETAILED DESCRIPTION

Figure 1:
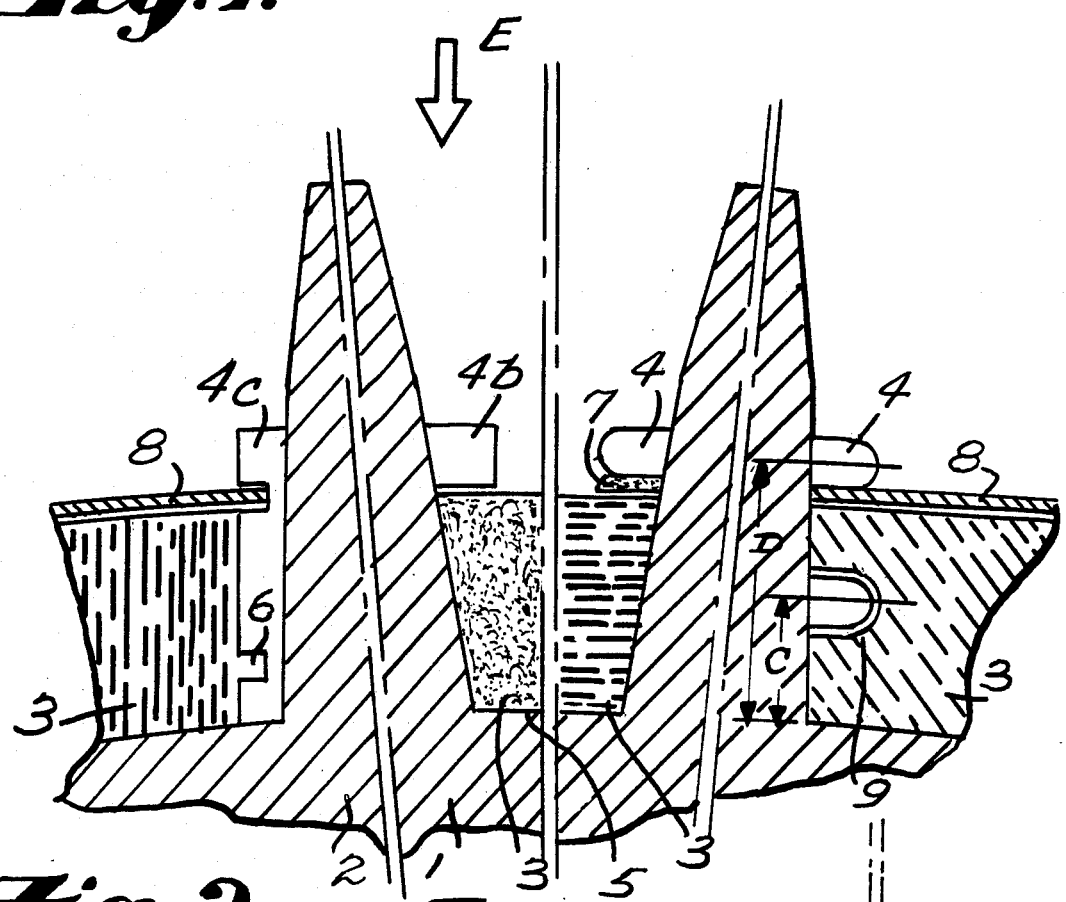
FIG. 1 is a schematic illustration of a shielding container of the invention.
Figure 2:
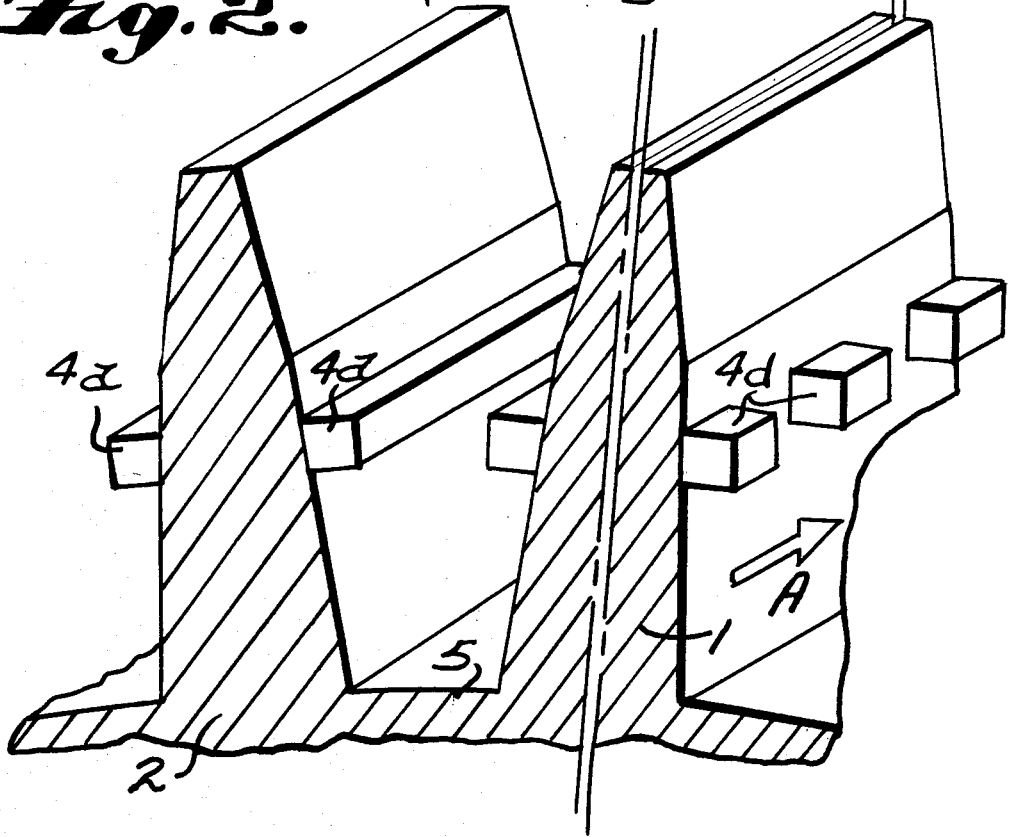
FIG. 2 shows an alternative form of the invention.

Referring more specifically to the drawings the neutron shielding 3 is disposed between the bar shaped cooling fins or flanges 1. According to the invention there are fastened bosses 4 on the cooling fins 1. The neutron shielding 3 in the form of suitable molded bodies can be inserted, e.g. by pushing in direction A (FIG. 2) below the bosses 4 lengthwise in the space between the cooling fins. The bosses prevent the neutron shielding from falling out. The bosses 4 can be rounded or are provided completely or partially with planar surfaces 4b. Furthermore, the bosses 4 can be formed as continuous bars 4a. However, they can also consist of knob shaped structures. In order to suit the actual shielding requirements corresponding to the neutron shielding 3 there has been proven good the installing of the bosses 4 in several series at a distance of for example C and D (FIG. 1) from the container body surface 5. The neutron shielding 3 then is provided in the case of a molded body with a profile 9.

It is also suitable to provide sharp pointed cooling fins with the bosses 4 of the invention as an anchoring possibility.

It is easily feasible to push elastic neutron shielding material from above in direction E (FIG. 1) over the corresponding suitably constructed bosses 4 in the space provided between the cooling fins 1. Also filling the provided space between the cooling fins 1 with hardening or solidifying neutron absorbing material 3 has been found to be a very suitable procedure in which the bosses 4 likewise outstandingly fulfill the safety function according to the invention.

It has proven particularly favorable to mold on and cast on the bosses 4 of the invention. Also it is particularly advantageous to form the bosses 4c up to the container body surface and to provide recesses 6.

Figure 3:
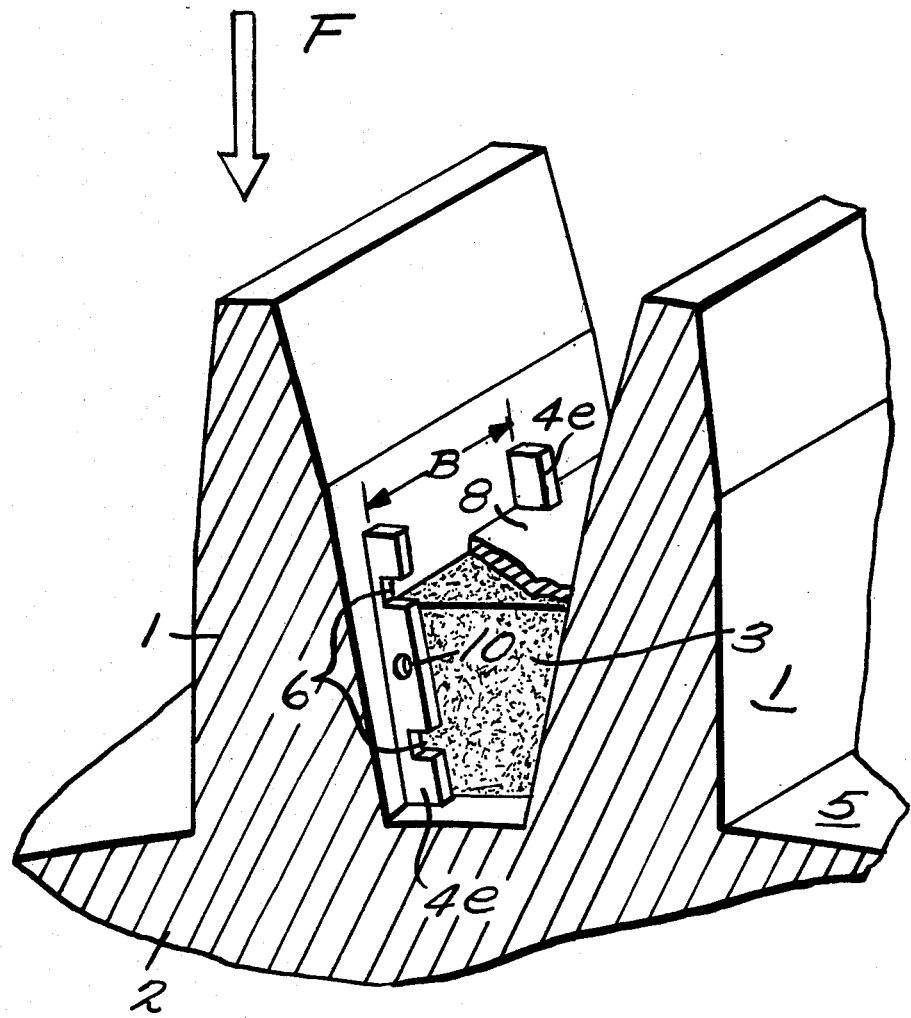
FIG. 3 shows another modification of the container of the invention.

The bosses 4c with the recesses 6 analogous to the bosses 4a can be formed continuously or, however, as boss strips 4e (FIG. 3). Between the boss strips 4e the neutron shielding 3 can be inserted from above, direction F (FIG. 3), whereby the neutron shielding 3 either consists of molded bodies of the length B, or of longer molded pieces with block-outs which provide a place for the boss strip 4e in the distances B. This arrangement is also well suited for cooling fins arranged transverse to the container axis. The neutron shielding 3 is guaranteed by a suitable securing mechanism, e.g. bolts or split pins which are fastened in the bores 10 of the boss strips 4e. Other safety other mechanisms are possible.

It has been found particularly advantageous if there are located covering strips 8 between the neutron shielding 3 and the bosses 4 which are either pushed in direction A or squeezed in direction E and have a securing and protection function. The covering strips 8 also can be led into the recessed 6 which has proven to be particularly advantageous. As covering strips 8 there can be employed elastic and flexible materials with suitable properties. In a few cases covering strips 8 of metal with neutron absorbing additives have proven especially favorable. In some cases in using the covering strips 8 of the invention there can also be employed neutron absorbing material 3 which is not present as a molded body, preferably suited is a material such as powder or granulate.

It is particularly advantageous to calk gaps between the bosses 4 and the neutron shielding 3 with suitable water calking and elastic material 7, for example silicone rubber. This is also true for all other gaps, e.g. between the cooling fins 2 and the covering strips 8, etc.

The entire disclosure of German priority application G 7932570.5 is hereby incorporated by reference.

What is claimed is:

1. A container for radioactive materials which produce gamma and neutron-radiation emissions and residual heat, comprising, in combination, a container body having shielding means for gamma radiation, an exterior surface, a plurality of spaced-apart cooling fins projecting from said exterior surface and connected at one end thereof to said exterior surface of said container body, at least some of said cooling fins having boss means thereon intermediate the ends thereof, neutron shielding means removably disposed on said exterior surface of said container and removably held in place between said cooling fins by said boss means so that, in the event any cooling fin is damaged, said neutron shielding means can be removed to permit access to the portion of said cooling fin between said boss means and said exterior surface of said body.

2. A container according to claim 1 wherein the boss means are cast on the fins.

3. A container according to claim 1 wherein the boss means extend along each said fin up to the surface of the container body and have recesses therein.

4. A container according to claim 1 wherein gaps are provided between the boss means and the neutron shielding means which are filled with a water repellent and elastic material.

5. A container according to claim 3 wherein the gaps between the boss means and the neutron shielding means are filled with a water repellent and elastic material.

6. A container according to claim 4 wherein all other gaps in the container structure are also filled with water repellent and elastic material.

* * * * *